United States Patent
Pearson

(10) Patent No.: US 10,697,635 B2
(45) Date of Patent: Jun. 30, 2020

(54) IMPINGEMENT COOLED COMPONENTS HAVING INTEGRAL THERMAL TRANSFER FEATURES

(71) Applicant: United Technologies Corporation, Farmington, CT (US)

(72) Inventor: Matthew Robert Pearson, Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 392 days.

(21) Appl. No.: 15/463,025

(22) Filed: Mar. 20, 2017

(65) Prior Publication Data

US 2018/0266688 A1  Sep. 20, 2018

(51) Int. Cl.
*F23R 3/00* (2006.01)
*F02C 3/04* (2006.01)
*F23R 3/06* (2006.01)

(52) U.S. Cl.
CPC .............. *F23R 3/005* (2013.01); *F02C 3/04* (2013.01); *F23R 3/002* (2013.01); *F23R 3/06* (2013.01); *F23R 2900/00018* (2013.01); *F23R 2900/03041* (2013.01); *F23R 2900/03044* (2013.01)

(58) Field of Classification Search
CPC .. F23R 3/002; F23R 3/005; F23R 3/06; F23R 3/42; F23R 2900/03041; F23R 2900/03043; F23R 2900/03044; F05D 2260/207; F23M 5/08
See application file for complete search history.

(56) References Cited

U.S. PATENT DOCUMENTS

| | | | |
|---|---|---|---|
| 3,857,990 A | 12/1974 | Reed et al. | |
| 4,013,047 A | 3/1977 | Harned | |
| 4,736,693 A | 4/1988 | Clomburg, Jr. | |
| 4,825,814 A | 5/1989 | Meijer | |
| 4,986,253 A | 1/1991 | Bienert et al. | |
| 7,549,368 B2 | 6/2009 | Heidrich et al. | |
| 2003/0213250 A1* | 11/2003 | Pacheco-Tougas | F23R 3/002 60/752 |
| 2004/0146399 A1 | 7/2004 | Bolms et al. | |
| 2008/0127652 A1 | 6/2008 | Putz | |

(Continued)

FOREIGN PATENT DOCUMENTS

| | | |
|---|---|---|
| EP | 0565442 A1 | 10/1993 |
| EP | 1104871 A1 | 6/2001 |
| WO | 1992007227 | 4/1992 |

OTHER PUBLICATIONS

English-language translation of Lancelot EP0565442 (Year: 1993).*
(Continued)

*Primary Examiner* — Scott J Walthour
*Assistant Examiner* — Colin J Paulauskas
(74) *Attorney, Agent, or Firm* — Cantor Colburn LLP

(57) ABSTRACT

Components for gas turbine engines having a hot side surface, a cold side surface, the cold side surface receiving cooling impingement at one or more cold locations, and at least one thermal transfer feature located between the hot side surface and the cold side surface within the component and arranged such that a condenser section of the thermal transfer feature is located proximate at least one of the cold locations and an evaporator section of the thermal transfer feature is located away from the cold location.

16 Claims, 12 Drawing Sheets

(56) References Cited

U.S. PATENT DOCUMENTS

| | | | |
|---|---|---|---|
| 2010/0242485 A1* | 9/2010 | Davis, Jr. | F23R 3/002 60/752 |
| 2012/0121381 A1* | 5/2012 | Charron | F01D 9/023 415/115 |
| 2013/0305730 A1 | 11/2013 | Donnelly et al. | |
| 2014/0238030 A1 | 8/2014 | Gerendas | |
| 2016/0273771 A1 | 9/2016 | Cunha et al. | |

OTHER PUBLICATIONS

European Search Report, European Application No. 18162933.8, dated Aug. 20, 2018, European Patent Office; EP Search Report 7 pages.

"Annealed pyrolytic graphite", Wikipedia, Retrieved from the Internet Feb. 10, 2017: https://en.wikipedia.org/wiki/Annealed_pyrolytic_graphite; 3 pages.

"Merit Number and Fluid Selection", Heat Pipe Working Fluid Selection Heat Pipe Technology, Retrieved on the Internet Feb. 10, 2017: https://www.1-act.com/merit-number-and-fluid-selection/; 3 pages.

"Micro and Miniature Heat Pipes From Thermal-FluidsPedia" Thermal-FluidsCentral; Retrieved from the Internet on Feb. 10, 2017: http://www.thermalfluidscentral.org/encyclopedia/index.php/Micro_and_Miniature_Heat_Pipes; 1 page.

Baughn, et al. "An Experimental Study of Entrainment Effects on the Heat Transfer from a Flat Surface to a Heated Circular Impinging Jet," Journal of Heat Transfer, vol. 113, No. 44, 1991, pp. 1023-1025.

Baughn, et al., "Heat Transfer Measurements from a Surface with Uniform Heat Flux and an Impinging Jet," Journal of Heat Transfer, vol. 111, No. 4, 1989, pp. 1096-1098.

K-Core, Thermacore Thermal Management Solutions, 2013; 4 pages.

* cited by examiner

IMPINGEMENT COOLED COMPONENTS HAVING INTEGRAL THERMAL TRANSFER FEATURES

BACKGROUND

The subject matter disclosed herein generally relates to impingement cooled components for gas turbine engines and, more particularly, impingement cooled components having integral thermal transfer features located therein.

A combustor of a gas turbine engine may be configured and required to burn fuel in a minimum volume (e.g., a combustion chamber). Such configurations may place substantial heat load on the structure of the combustor. The heat loads may dictate that special consideration is given to structures which may be configured as heat shields or panels configured to protect the walls of the combustor, with the heat shields being air cooled. Even with such configurations, excess temperatures at various locations may occur leading to oxidation, cracking, and high thermal stresses of the heat shields or panels. As such, impingement and convective cooling of panels of the combustor wall may be used. Convective cooling may be achieved by air that is trapped between the panels and a shell of the combustor. Impingement cooling is a process of directing relatively cool air from a location exterior to the combustor toward a back or underside of the panels. Leakage of impingement cooling air may occur through effusion holes without the panel or between adjacent panels at gaps that exist between the panels and thus form film cooling over a surface of the panels. However, it may be advantageous to have improved cooling mechanisms for combustor panels.

SUMMARY

According to some embodiments, combustors of gas turbine engines are provided. The combustors include a combustor shell having a plurality of impingement holes, the combustor shell defining a combustion chamber, a combustor panel mounted to the combustor shell within the combustion chamber, the combustor panel having a plurality of effusion holes formed therein, and at least one thermal transfer feature located within the combustor panel and arranged such that a condenser section of the thermal transfer feature is located proximate at least one of the plurality of impingement holes and an evaporator section of the thermal transfer feature is located away from the condenser section.

In addition to one or more of the features described above, or as an alternative, further embodiments of the combustors may include that the at least one thermal transfer feature is defined by a thermal transfer feature cavity formed within the combustor panel, the thermal transfer feature having a thermal transfer media contained within the thermal transfer feature cavity.

In addition to one or more of the features described above, or as an alternative, further embodiments of the combustors may include that the thermal transfer media is lithium, sodium, potassium, cesium, or encapsulated pyrolytic graphite.

In addition to one or more of the features described above, or as an alternative, further embodiments of the combustors may include that the at least one thermal transfer feature is a solid state thermal transfer feature.

In addition to one or more of the features described above, or as an alternative, further embodiments of the combustors may include that the at least one thermal transfer feature is disc-shaped.

In addition to one or more of the features described above, or as an alternative, further embodiments of the combustors may include that the at least one thermal transfer feature extends from proximate a first impingement hole to proximate a second impingement hole, wherein the evaporator section of the thermal transfer feature is located between the first and second impingement holes.

In addition to one or more of the features described above, or as an alternative, further embodiments of the combustors may include that the at least one thermal transfer feature comprises plurality of thermal transfer features including a first-type thermal transfer feature and a second-type thermal transfer feature, wherein the first-type thermal transfer feature extends within the combustor panel from proximate one impingement hole to proximate another impingement hole and the second-type thermal transfer feature has a single end located proximate an impingement hole.

In addition to one or more of the features described above, or as an alternative, further embodiments of the combustors may include that the combustor panel is formed from a first panel sheet and a second panel sheet and the thermal transfer feature is formed between the first and second panel sheets.

In addition to one or more of the features described above, or as an alternative, further embodiments of the combustors may include that the first panel sheet includes a thermal transfer feature cavity and the second panel sheet is a continuous panel and the first panel sheet has a greater thickness than the second panel sheet at locations away from the thermal transfer feature.

In addition to one or more of the features described above, or as an alternative, further embodiments of the combustors may include that the first panel sheet includes a thermal transfer feature cavity and the second panel sheet includes a thermal transfer feature cavity, wherein the thermal transfer feature cavities of the first and second panel sheets are aligned.

In addition to one or more of the features described above, or as an alternative, further embodiments of the combustors may include that the first panel sheet includes a thermal transfer feature cavity and the second panel sheet includes a thermal transfer feature cavity, wherein the thermal transfer feature cavities of the first and second panel sheets are offset from each other.

In addition to one or more of the features described above, or as an alternative, further embodiments of the combustors may include that the at least one thermal transfer feature is a micro heat pipe.

According to some embodiments, methods of manufacturing combustor panels of a gas turbine engines are provided. The methods include forming a thermal transfer feature cavity in at least one panel sheet of a combustor panel, filling the thermal transfer feature cavity with a thermal transfer media, and sealing the thermal transfer media within the combustor panel.

In addition to one or more of the features described above, or as an alternative, further embodiments of the methods may include that the combustor panel comprises a first panel sheet and a second panel sheet, and the sealing comprises joining the first panel sheet to the second panel sheet with the thermal transfer feature located therebetween.

In addition to one or more of the features described above, or as an alternative, further embodiments of the methods may include that joining comprises at least one of brazing, friction welding, and clinching.

In addition to one or more of the features described above, or as an alternative, further embodiments of the methods may include that the filling and sealing are performed under vacuum conditions.

In addition to one or more of the features described above, or as an alternative, further embodiments of the methods may include that forming the thermal transfer feature comprises at least one of micromachining, grinding, laser cutting, or chemical etching.

In addition to one or more of the features described above, or as an alternative, further embodiments of the methods may include that filling the thermal transfer feature cavity comprises inserting a solid-state material into the thermal transfer feature cavity.

According to some embodiments, components for gas turbine engines are provided. The components include a hot side surface, a cold side surface, the cold side surface receiving cooling impingement at one or more cold locations, and at least one thermal transfer feature located between the hot side surface and the cold side surface within the component and arranged such that a condenser section of the thermal transfer feature is located proximate at least one of the cold locations and an evaporator section of the thermal transfer feature is located away from the cold location.

In addition to one or more of the features described above, or as an alternative, further embodiments of the components may include that the component is a blade outer air seal, a combustor panel, or a combustor shell.

Technical effects of embodiments of the present disclosure include panels of a combustor that have integrated cooling features to improve thermal conditions of the combustor panels within the combustion chamber of a gas turbine engine. Technical effects further include combustor panels having thermal transfer features formed therein in the form of cooling cavities, channels, or structures that are positioned relative to impingement holes to enable or enhance thermal transfer from areas or zones that are not proximate the impingement holes.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
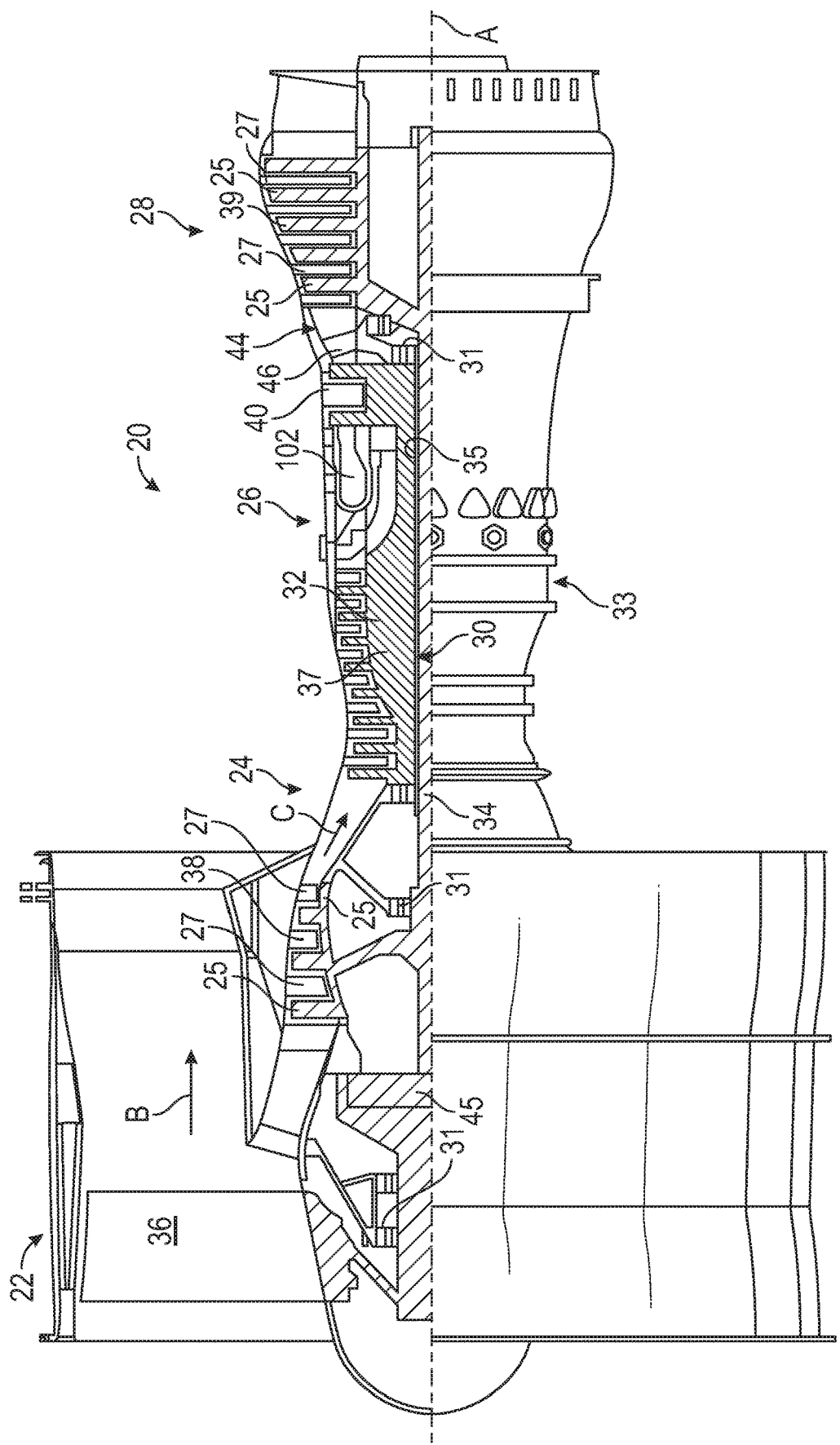
FIG. 1A is a schematic cross-sectional illustration of a gas turbine engine that may employ various embodiments disclosed herein.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 102 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 102, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°R)]^{0.5}$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Figure 1B:
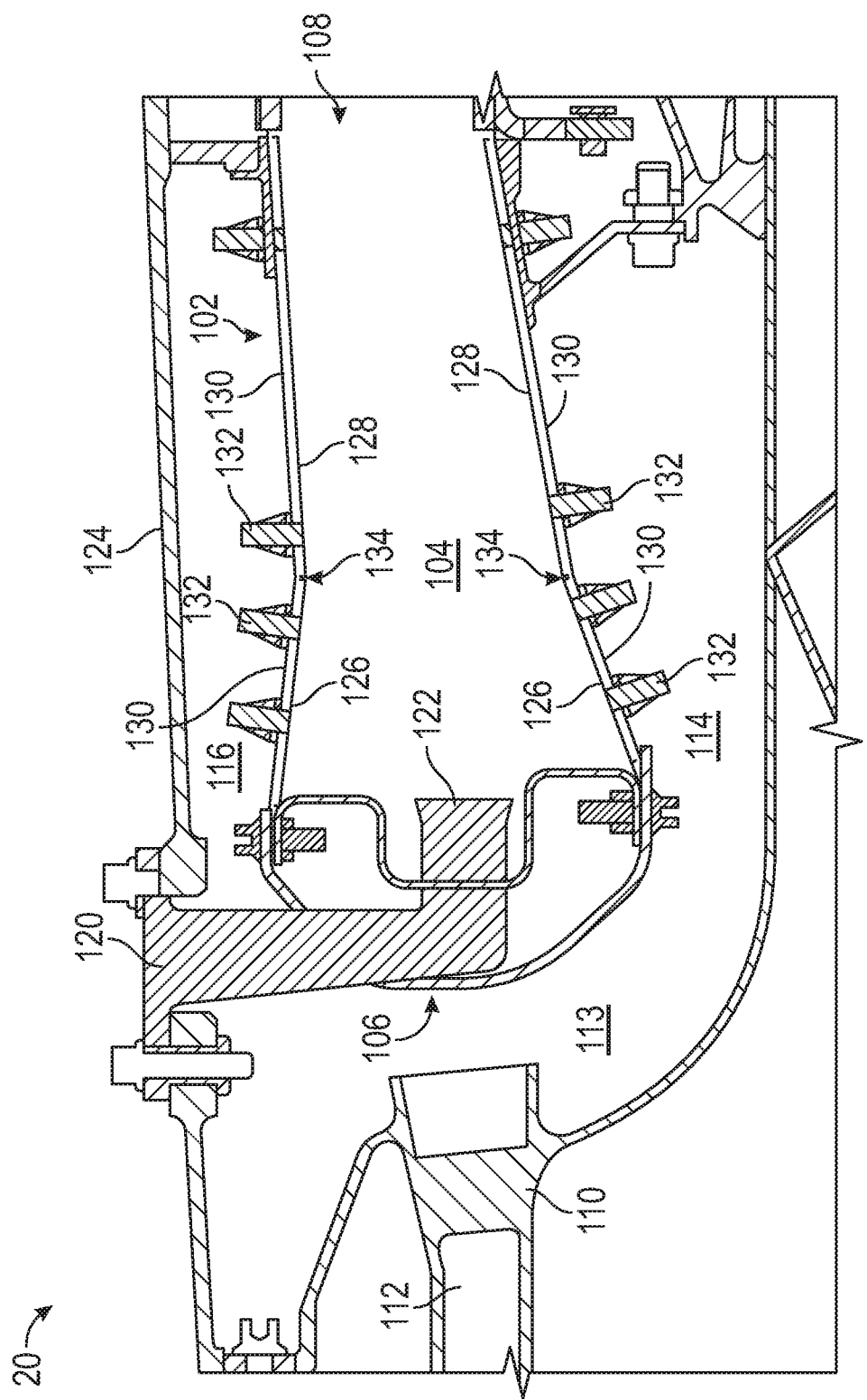
FIG. 1B is a schematic illustration of a combustor section of the gas turbine engine of FIG. 1A that may employ various embodiments disclosed herein.

FIG. 1B is a schematic illustration of a configuration of a combustion section of the engine 20 that can employ embodiments of the present disclosure. As shown, the engine 20 includes a combustor 102 defining a combustion chamber 104. The combustor 102 includes an inlet 106 and an outlet 108 through which air may pass. The air is supplied to the combustor 102 by a pre-diffuser 110.

In the configuration shown in FIG. 1B, air may be supplied from a compressor into an exit guide vane 112, as will be appreciated by those of skill in the art. The exit guide vane 112 is configured to direct the airflow into the pre-diffuser 110, which then directs the airflow toward the combustor 102. The combustor 102 and the pre-diffuser 110 are separated by a shroud plenum, cavity, or chamber 113 that contains the combustor 102. The shroud chamber 113 includes an inner diameter branch 114 and an outer diameter branch 116. As air enters the shroud chamber 113, a portion of the air will flow into the combustor inlet 106, a portion will flow into the inner diameter branch 114, and a portion will flow into the outer diameter branch 116. The air from the inner diameter branch 114 and the outer diameter branch 116 will then enter the combustion chamber 104 by means of one or more nozzles, holes, apertures, etc. that are formed on the external surfaces of the combustor 102. The air will then exit the combustion chamber 104 through the combustor outlet 108. At the same time, fuel is supplied into the combustion chamber 104 from a fuel injector 120 and a pilot nozzle 122. The fuel is ignited within the combustion chamber 104. The combustor 102 of the engine 20, as shown, is housed within a shroud case 124 which defines, in part, the shroud chamber 113.

The combustor 102, as will be appreciated by those of skill in the art, includes one or more combustor panels 126, 128 that are mounted on an interior surface of one or more combustor shells 130 and are configured parallel to the combustor shell 130 (whether at the inner or outer diameter). The combustor panels 126, 128 can be removably mounted to the combustor shell 130 by one or more attachment mechanisms 132. In some embodiments, the attachment mechanisms 132 can be integrally formed with a respective combustor panel 126, 128 and/or the combustor shell 130, although other configurations are possible. In some embodiments, the attachment mechanisms 132 are bolts or other structures that extend from the respective combustor panel 126, 128 through the interior surface thereof to a receiving portion or aperture of the combustor shell 130 such that the panel 126, 128 can be attached to the combustor shell 130 and held in place.

The combustor panels 126, 128 may include a plurality of cooling holes and/or apertures to enable fluid, such as gases, to flow from areas external to the combustion chamber 104 into the combustion chamber 104. Impingement cooling may be provided from the shell-side of the panels 126, 128 and hot gases may be in contact with the combustion-side of the panels 126, 128 during combustion within the combustion chamber 104. That is, hot gases may be in contact with a surface of the panels 126, 128 that is facing the combustion chamber 104.

First panels 126, as shown in FIG. 1B, are configured about the inlet 106 of the combustor 102 and may be referred to as forward panels. Second panels 128 may be positioned axially rearward and adjacent the first panels 126 and may be referred to as aft panels. The first panels 126 and the second panels 128 are configured with a gap 134 formed between axially adjacent first panels 126 and second panels 128. The gap 134 may be a circumferentially extending gap that extends about a circumference of the combustor 102. A plurality of first panels 126 and second panels 128 may be attached and extend about an inner diameter of the combustor 102, and a separate plurality of first and second panels 126, 128 may be attached and extend about an outer diameter of the combustor 102, as known in the art.

Figure 1C:
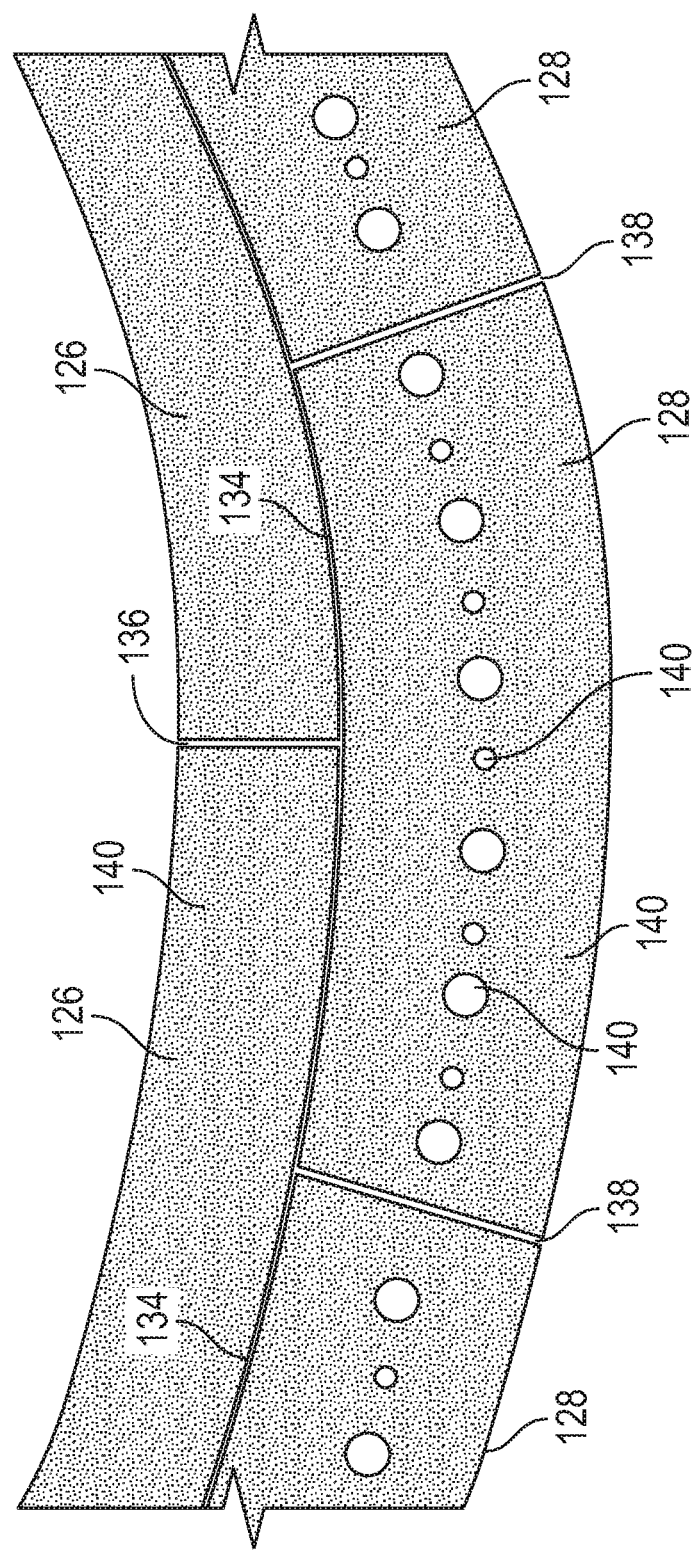
FIG. 1C is a schematic illustration of panels of the combustor of the combustor section shown in FIG. 1B that may employ various embodiment disclosed herein.

Turning now to FIG. 1C, a partial schematic illustration of a configuration of the combustor panels 126, 128 installed within the combustor 102 as viewed from the interior of the combustion chamber 104 is shown. The first panels 126 are installed to extend circumferentially about the combustion chamber 104 and form first axially extending gaps 136 between circumferentially adjacent first panels 126. Similarly, the second panels 128 are installed to extend circumferentially about the combustion chamber 104 and second axially extending gaps 138 are formed between circumferentially adjacent second panels 128. Moreover, as shown, a circumferentially extending gap 134 is shown between axially adjacent first and second panels 126, 128. Also shown in FIG. 1C are the various cooling holes (e.g., impingement holes), apertures, and other fluid flow paths 140 that are formed in the surfaces of the combustor panels 126, 128 to enable cooling flow and/or mixing flow to pass through the combustor panels 126, 128 (e.g., into and/or out of the page of FIG. 1C).

The combustor shell 130 can include impingement holes that allow cooling flow to impinge on an external (opposite the combustion chamber 104) surface of the combustor panels 126, 128 from the inner diameter branch 114 and the outer diameter branch 116 of the shroud chamber 113. The impinging cooling air is used to cool the combustor panels 126, 128. The impinging air can provide extremely high cooling (i.e., heat transfer coefficient) in the impingement zone, e.g., directly inboard from the impingement holes on the combustor panels 126, 128. However, such cooling may quickly decay as a radial distance increases from the impingement hole. Thus, the portion of the combustor panel directly adjacent the impingement hole is locally very cool, but hotspots occur in regions that are "far" (e.g., a distance greater than a few hole-diameters from the nearest impingement hole). These hot spots can cause degradation of the combustor panels, reducing durability and life. The effect can be compounded because the combustor panels can be made from Inconel or other nickel-based superalloys, which have low thermal conductivity. Impingement holes cool very effectively directly beneath the hole (referred to herein as an "impingement point") but such cooling effectiveness decays rapidly as the distance from the impingement point increases.

Figure 2:
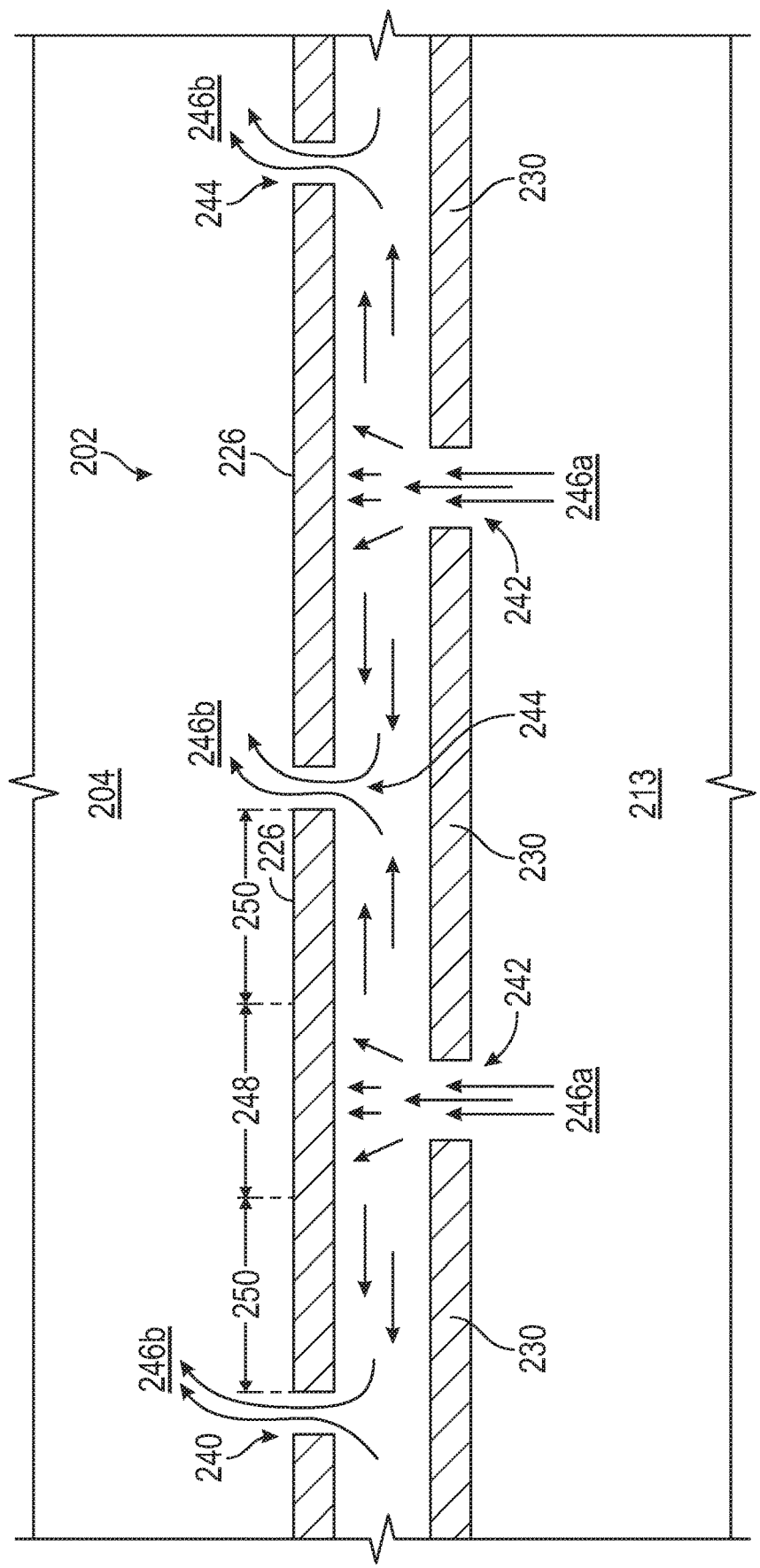
FIG. 2 is a schematic illustration of a combustor panel arranged relative to a combustor shell that can incorporate embodiments of the present disclosure.

For example, turning now to FIG. 2, a schematic illustration of a portion of a combustor 202 having a combustor shell 230 and a combustor panel 226 installed thereon that can incorporate embodiments of the present disclosure is shown. The combustor 202 can be formed similar to that shown and described above. The combustor shell 230 includes a plurality of impingement holes 242 and the combustor panel 226 includes a plurality of effusion holes 244. The impingement holes 242 are designed to enable a cooling flow of air 246 (having an impinging portion 246a and a film cooling portion 246b) to cool the combustor 202. The cooling flow of air 246 passes from a shroud chamber 213, through the impingement holes 242, through the effusion holes 244, and into a combustion chamber 204 of the combustor 202. The film cooling portion 246b of the cooling flow of air, as it enters the combustion chamber 204 through the effusion holes 244, can form a film of air over an interior surface of the combustor panel 226 to aid in cooling of the combustor panel 226. That is, the film cooling portion 246b can form a barrier between air at combustion temperatures and the combustor panel 226.

Although shown in FIG. 2 as simple passages, the effusion holes 244 may not be formed straight through or normal to the combustor panel 226. That is, as will be appreciated by those of skill in the art, effusion holes are often not formed normal to the panel, but rather can be angled, such as at shallow angles (e.g., 30 degrees) with respect to the plane of the combustor panel 226. Angled effusion holes can ensure and/or optimize the exit flowing air to "stick" to the combustor panel 226, thus creating a film cooling layer on the combustion chamber 204 side of the combustor panels 226. Further, in some embodiments, the impingement holes 242 can be formed normal to the combustor shell 230, as schematically shown in FIG. 2. Those of skill in the art will appreciate that FIG. 2 is provided for explanatory and illustrative purposes and is not to be limiting.

As schematically shown, the impinging portion 246a of the cooling air 246 will impinge upon and cool an impingement area or primary cooling zone 248 which is cooled by the cooling air 246. However, as the distance from the impingement hole 242 increases the effective cooling decreases at a secondary cooling zone 250 that is not cooled as effectively as the primary cooling zone 248.

The cooling air 246 cools the combustor panels 226 with impinging air 246a, which provides extremely high cooling (heat transfer coefficient) in the impingement zone (primary cooling zone 248), but the cooling quickly decays as the distance from the primary cooling zone 248 increases (e.g., the secondary cooling zone 250). Thus, the portion of the combustor panel 226 under the impingement hole 242 is locally very cool, but hotspots can occur in regions that are "far" (e.g., a distance greater than a few hole-diameters from the nearest impingement hole 242). The hot spots (located within the secondary zone 250) can cause degradation of the combustor panel 226, reducing the panel durability and life. The effect can be compounded because the combustor panels may be made from Inconel or similar nickel-based superalloys, which have low thermal conductivity. Accordingly, improved cooling of combustor panels may provide improved life and operation of combustors in gas turbine engines.

In accordance with embodiments of the present disclosure, thermal transfer features are formed within combustor panels to distribute cooling provided by impinging cooling air across the combustor panel. For example, in some embodiments, small scale heat pipes and/or thermal transfer feature cavities are integrated within the combustor panel. Such thermal transfer features can provide very-high in-plane effective thermal conductivity of the combustor panel. Such improved in-plane effective thermal conductivity can reduce hot spot temperatures (e.g., in the secondary zones), because heat at those hot spots is transported along the heat pipe and removed near an impingement hole by the impinging air flow. As noted, heat pipes or cavities can be integrated within the combustor panels, however, various other structures and/or arrangements can be employed with departing from the scope of the present disclosure. For example, alternative methods to achieve similar end-result of high in-plane conductivity can include, but is not limited to, encapsulated pyrolytic graphite layers, vapor chambers, etc.

Figure 3:
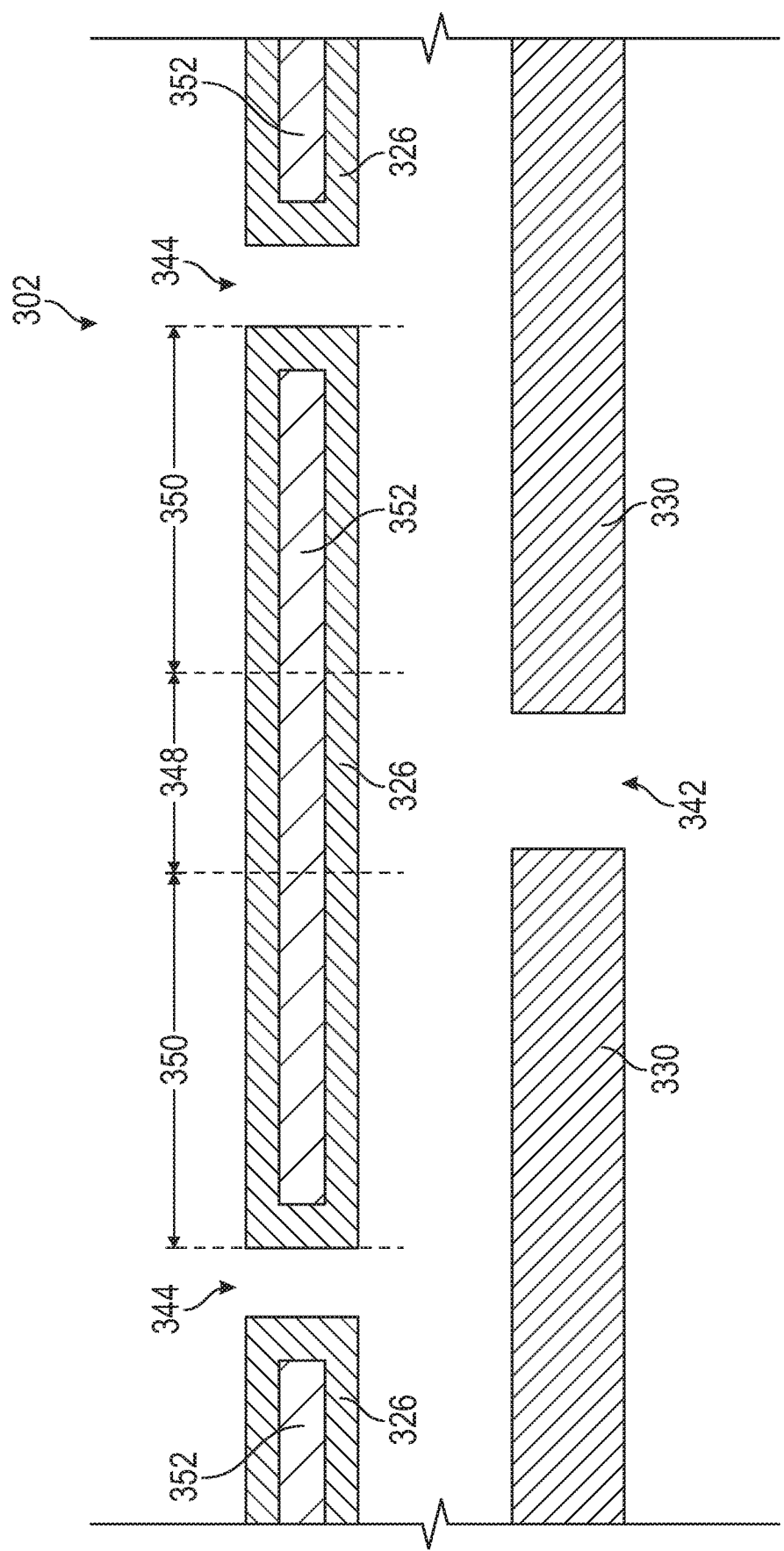
FIG. 3 is a schematic illustration of a combustor panel having a thermal transfer feature in accordance with an embodiment of the present disclosure.

Turning now to FIG. 3, a schematic illustration of a combustor 302 configured in accordance with an embodiment of the present disclosure is shown. The combustor 302 is similar to that shown and described above and may be installed within a gas turbine engine. The combustor 302 includes a combustor shell 330 having one or more impingement holes 342 and one or more combustor panels 326 installed thereto. The combustor panels 326 can include effusion holes 344 that allow cooling air flow to pass therethrough and form a cooling film on a combustion chamber surface as described above.

As shown, the combustor panel 326 includes one or more thermal transfer features 352. The thermal transfer features 352 are designed to at least one of (i) distribute or disperse cooling from a primary zone 348 to a secondary zone 350 or (ii) transfer heat from the secondary zone 350 to the primary zone 348 and thus cool the secondary zone 350. As noted above, the thermal transfer features 352 are formed within the combustor panel 326 and can be heat pipes, cavities, thermal transfer plates or sheets, or other structure. Given the thickness of the combustor panels, the heat pipes may be miniature or micro heat pipes, with hydraulic diameters of 0.5 to 5 mm (miniature) or 10 to 500 μm (micro). It will be appreciated that, depending on the arrangement and configuration of the thermal transfer features 352, the thickness of the combustor panels 326 can be optionally increased to accommodate the thermal transfer features 352 therein.

In the arrangement of FIG. 3, and in accordance with certain embodiments, the portion of the thermal transfer feature 352 that is proximate the impingement hole 342 (e.g., primary zone 348) is a condenser portion or section of the thermal transfer feature 352 where a thermal transfer media may condense due to the relatively cool temperatures provided by the cooling air from the impingement hole 342. The secondary zones 350 are evaporator sections or portions of the thermal transfer feature 352, which are away from the cooling air of the impingement hole 342. As such, heat can be transferred from the secondary zones 350 to the primary zone 348 and cooling of the combustor panel 326 can be achieved.

Although shown in FIG. 3 with the impingement hole 342 aligned with a center of the thermal transfer feature 352, various other configurations and/or arrangements are possible without departing from the scope of the present disclosure. For example, in some configurations, impingement holes can be positioned relative to the "edges" of the sections of the combustor panel as shown in FIG. 3, such that the primary zone 348 and the secondary zones 350 are switched in relative position (e.g., the secondary zone is located at the center of the section of the combustor panel).

The thermal transfer features in accordance with the present disclosure can take any desired shape or geometry. Thermal transfer features of the present disclosure can be formed, without limitation, with square or triangular cross-section, formed as cuts into a panel sheet, aligned or not aligned, etc. For example, turning to FIGS. 4A-4E, various schematic illustrations of thermal transfer features in accordance with the present disclosure are shown. The thermal transfer features of FIGS. 4A-4E can be defined by thermal pipe walls that are positioned between sections of the combustor panels or can be cavities defined by portions of the combustor panels. Each of FIGS. 4A-4E are cross-sectional illustrations showing the geometry of the thermal transfer features, and in such embodiments, the thermal transfer features can extend into and out of the page.

Figure 4A:
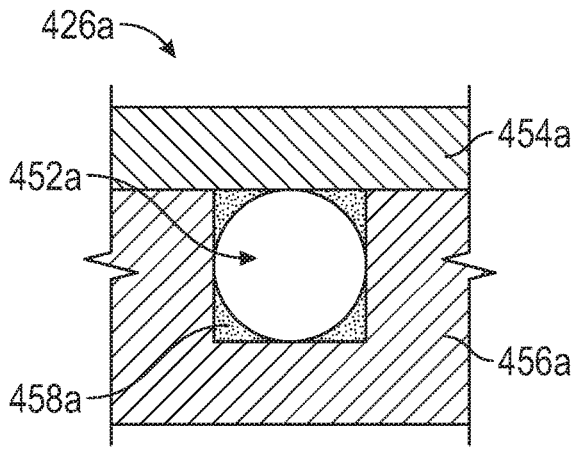
FIG. 4A is a schematic illustration of a geometry of a cross-section of a thermal transfer feature in accordance with an embodiment of the present disclosure.

Turning to FIG. 4A, a first example thermal transfer feature 452a in accordance with an embodiment of the present disclosure is shown. The thermal transfer feature 452a has a square cross-section formed between a first panel sheet 454a and a second panel sheet 456a. The first and second panel sheets 454a, 456a are joined to form a combustor panel 426a to be installed in a combustor of a gas turbine engine. The joining of the first and second panel sheets 454a, 456a can be by welding, brazing, fasteners, adhesives, etc. A thermal transfer media 458a is contained within the thermal transfer feature 452a and is selected to enable thermal transfer within and along the thermal transfer feature 452a. The thermal transfer media 458a can include any suitable high-temperature media as will be appreciated by those of skill in the art, including, but not limited to, lithium, sodium, potassium, and/or cesium. As shown in the embodiment of FIG. 4A, the thermal transfer feature 452a is formed primary within the second panel sheet 456a with three sides of the square geometry defined in the second panel sheet 456a and a single side of the thermal transfer feature 452a defined by the first panel sheet 454a. In such a configuration, the second panel sheet 456a is thicker than the first panel sheet 454a, as illustrated, to allow for the geometry of the thermal transfer feature 452a to be formed.

Figure 4B:
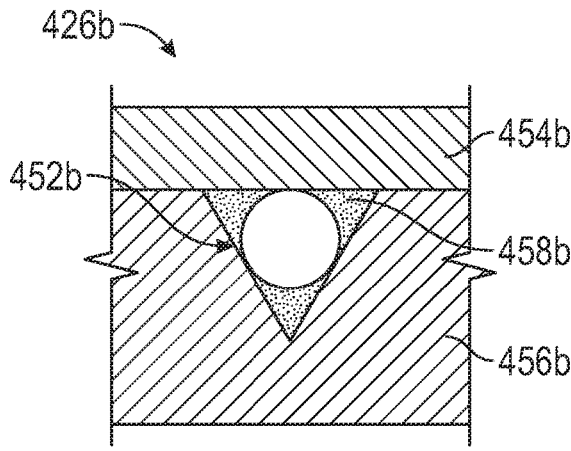
FIG. 4B is a schematic illustration of a geometry of a cross-section of a cross-section of a thermal transfer feature in accordance with an embodiment of the present disclosure.

Turning now to FIG. 4B, another example of a thermal transfer feature 452b in accordance with an embodiment of the present disclosure is shown. The thermal transfer feature 452b has a triangular cross-section formed between a first panel sheet 454b and a second panel sheet 456b, similar to that described above. The first and second panel sheets 454b, 456b are joined to form a combustor panel 426b to be installed in a combustor of a gas turbine engine. A thermal transfer media 458b is contained within the thermal transfer feature 452b and is selected to enable thermal transfer within and along the thermal transfer feature 452b. Similar to the embodiment of FIG. 4A, the thermal transfer feature 452b of FIG. 4B is formed primary within the second panel sheet 456b with two sides of the triangular geometry defined in the second panel sheet 456b and a single side of the thermal transfer feature 452b defined by the first panel sheet 454b. As noted, in such a configuration, the second panel sheet 456b is thicker than the first panel sheet 454b, as illustrated, to allow for the geometry of the thermal transfer feature 452a to be formed.

Figure 4C:
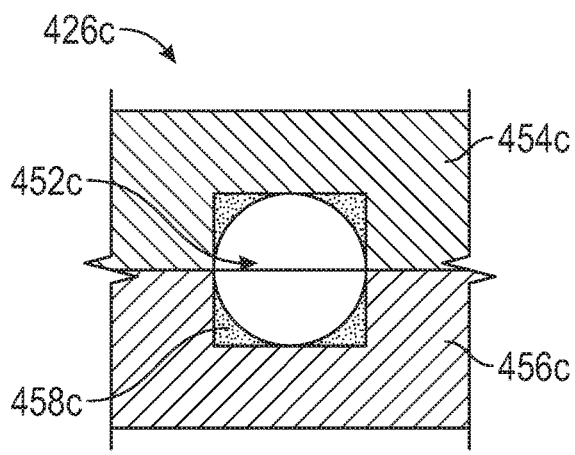
FIG. 4C is a schematic illustration of a geometry of a cross-section of a thermal transfer feature in accordance with an embodiment of the present disclosure.

Turning now to FIG. 4C, another example of a thermal transfer feature 452c in accordance with an embodiment of the present disclosure is shown. The thermal transfer feature 452c has a square cross-section formed between a first panel sheet 454c and a second panel sheet 456c, similar to that described above. The first and second panel sheets 454c, 456c are joined to form a combustor panel 426c to be installed in a combustor of a gas turbine engine. A thermal transfer media 458c is contained within the thermal transfer feature 452c and is selected to enable thermal transfer within and along the thermal transfer feature 452c. In this embodiment, the thermal transfer feature 452c of FIG. 4C is formed equally in the first and second panel sheets 454c, 456c. That is, half of the square geometry of the thermal transfer feature 452c is formed in the first panel sheet 454c and half is formed in the second panel sheet 456c. The portions of the thermal transfer feature 452c within the two panel sheets 454c, 456c are aligned to form the square geometry. In this embodiment, the first and second panel sheets 454c, 456c have similar thickness.

Figure 4D:
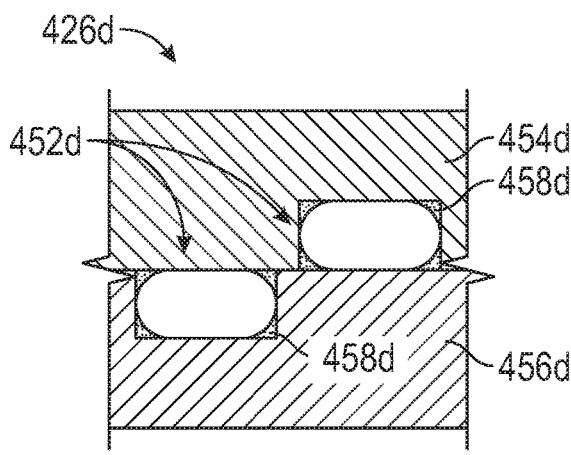
FIG. 4D is a schematic illustration of a geometry of a cross-section of a thermal transfer feature in accordance with an embodiment of the present disclosure.

Turning now to FIG. 4D, another example of a thermal transfer feature 452d in accordance with an embodiment of the present disclosure is shown. The thermal transfer feature 452d has a rectangular cross-section formed between a first panel sheet 454d and a second panel sheet 456d. The first and second panel sheets 454d, 456d are joined to form a combustor panel 426d to be installed in a combustor of a gas turbine engine. A thermal transfer media 458d is contained within the thermal transfer feature 452d and is selected to enable thermal transfer within and along the thermal transfer feature 452d. In this embodiment, the thermal transfer feature 452d of FIG. 4D is formed primarily in a panel sheet 454d, 456d, with a single wall or surface formed by the other of the panel sheet 454d, 456d. As shown, multiple thermal transfer features 452d can be formed in the panel sheets 454d, 456d. In this embodiment, each thermal transfer feature 452d is offset from the other thermal transfer feature 452d. In this embodiment, the first and second panel sheets 454c, 456c have similar thickness. The offset thermal transfer features 452d can increase the surface area of the combustor panel 426d that is covered by the thermal transfer features 452d to thus provide a greater surface area that is impacted by improved thermal transfer.

Figure 4E:
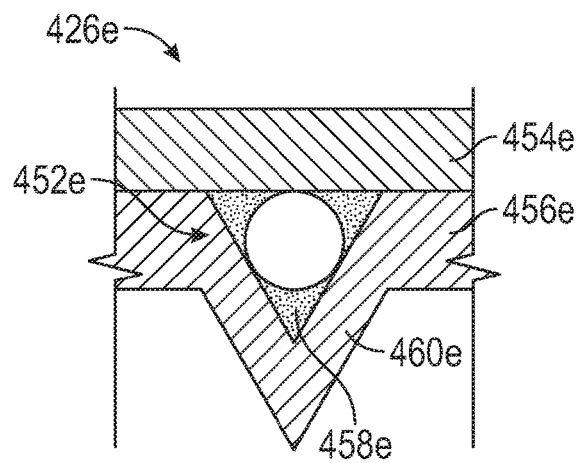
FIG. 4E is a schematic illustration of a geometry of a cross-section of a thermal transfer feature in accordance with an embodiment of the present disclosure.

Turning now to FIG. 4E, another example of a thermal transfer feature 452e in accordance with an embodiment of the present disclosure is shown. The thermal transfer feature 452e has a triangular cross-section formed between a first panel sheet 454e and a second panel sheet 456e. The first and second panel sheets 454e, 456e are joined to form a combustor panel 426e to be installed in a combustor of a gas turbine engine. A thermal transfer media 458e is contained within the thermal transfer feature 452e and is selected to enable thermal transfer within and along the thermal transfer feature 452e. In this embodiment, the second panel sheet 456e has a thermal transfer structure 460e. The thermal transfer structure 460e is a portion of the second panel sheet 456e that defines, in part, the geometry of the thermal transfer feature 452e. For example, as shown in FIG. 4E, the thermal transfer structure 460e is triangular in shape and defines a portion of the triangular thermal transfer feature 452e between the first and second panel sheets 454e, 456e. In such embodiment, the first and second panel sheets 454e, 456e can have substantially the same thickness at locations where the thermal transfer feature 452e is not located. Further, in some embodiment, the thickness of both panel sheets 454e, 456e can be the same for the entire surface, with portions of one or both of the sheets having thermal transfer structures 460e at the locations of the thermal transfer features 452e.

Although shown and described in FIGS. 4A-4E with triangular and/or squared cross-sections, those of skill in the art will appreciate that any geometric shape can be employed without departing from the scope of the present disclosure. For example, circular and/or elliptical cross-section thermal transfer features can be employed in some embodiments.

Figure 5:
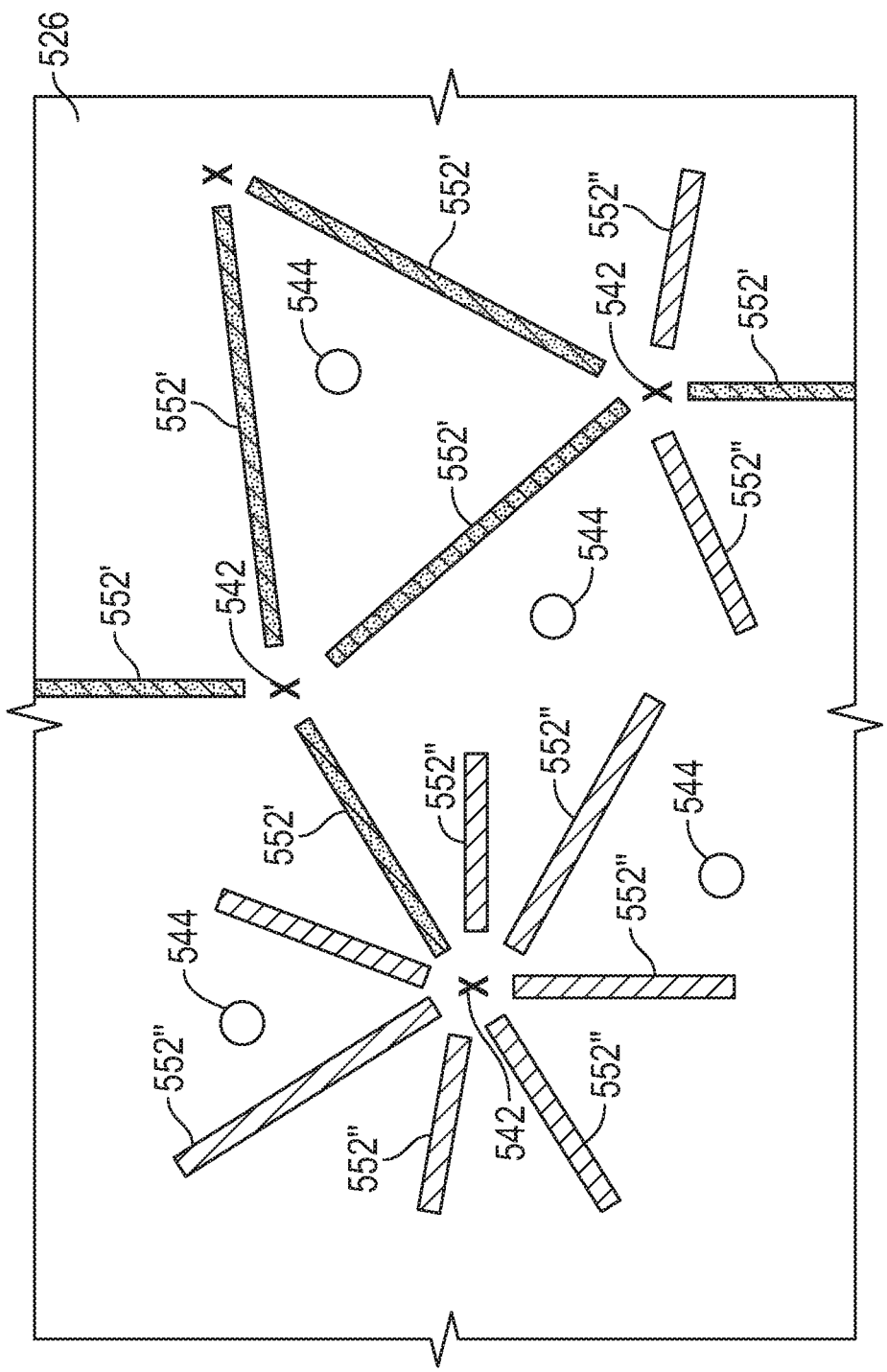
FIG. 5 is a schematic illustration of thermal transfer features arranged within a combustor panel in accordance with an embodiment of the present disclosure.

Turning now to FIG. 5, a top down, plan view schematic illustration of a combustor panel 526 in accordance with an embodiment of the present disclosure is shown. The combustor panel 526 includes a number of effusion holes 544, as described above, and is positioned relative to a combustor shell having a plurality of impingement holes 542 (illustrated as "X" in FIG. 5). The combustor shell in this embodiment is below the combustor panel 526 and thus is not shown and the impingement holes 542 are indicated for position relative to the combustor panel 526. The effusion holes 544 may be apertures that pass normal to the panel (e.g., into/out of the page) or may be angled relative to the combustor panel 526. Angling the effusion holes 544 can aid in the generation of film cooling of the combustor panel 526.

The combustor panel 526 is configured with a plurality of thermal transfer features 552', 552" which are arranged relative to the impingement holes 542. First-type thermal transfer features 552' are arranged with an impingement hole 542 at each end of the first-type thermal transfer feature 552'. As such, the first-type thermal transfer features 552' run from one impingement hole 542 to another impingement hole 542. Such arrangement cause a condenser section at each end of the first-type thermal transfer feature 552' (where heat is rejected to the impinging air). Evaporation within the first-type thermal transfer features occurs along the middle section (away from the impingement holes 542, absorbing heat from the combustor panel 526). In contrast, second-type thermal transfer features 552" have an impingement hole 542 located at one end. As such, the condenser section of the second-type thermal transfer feature 552" is located at one end near an impingement hole 542 and evaporation occurs along the remaining length by absorbing heat from the combustor panel 526. As illustrated in FIG. 5, the first- and second-type thermal transfer features are routed such that they do not cross or contact the impingement holes 542.

Although shown in FIG. 5 with the first- and second-type thermal transfer features 552', 552" being substantially linear or straight, those of skill in the art will appreciate that such in-plane geometry is not required. That is, the thermal transfer features need not be straight, but rather could be curved. For example, curved thermal transfer features may bend around an effusion hole or may be arranged to help route the thermal transfer feature to a region of combustor panel that is far from other thermal transfer features (e.g., a hot spot).

Figure 6:
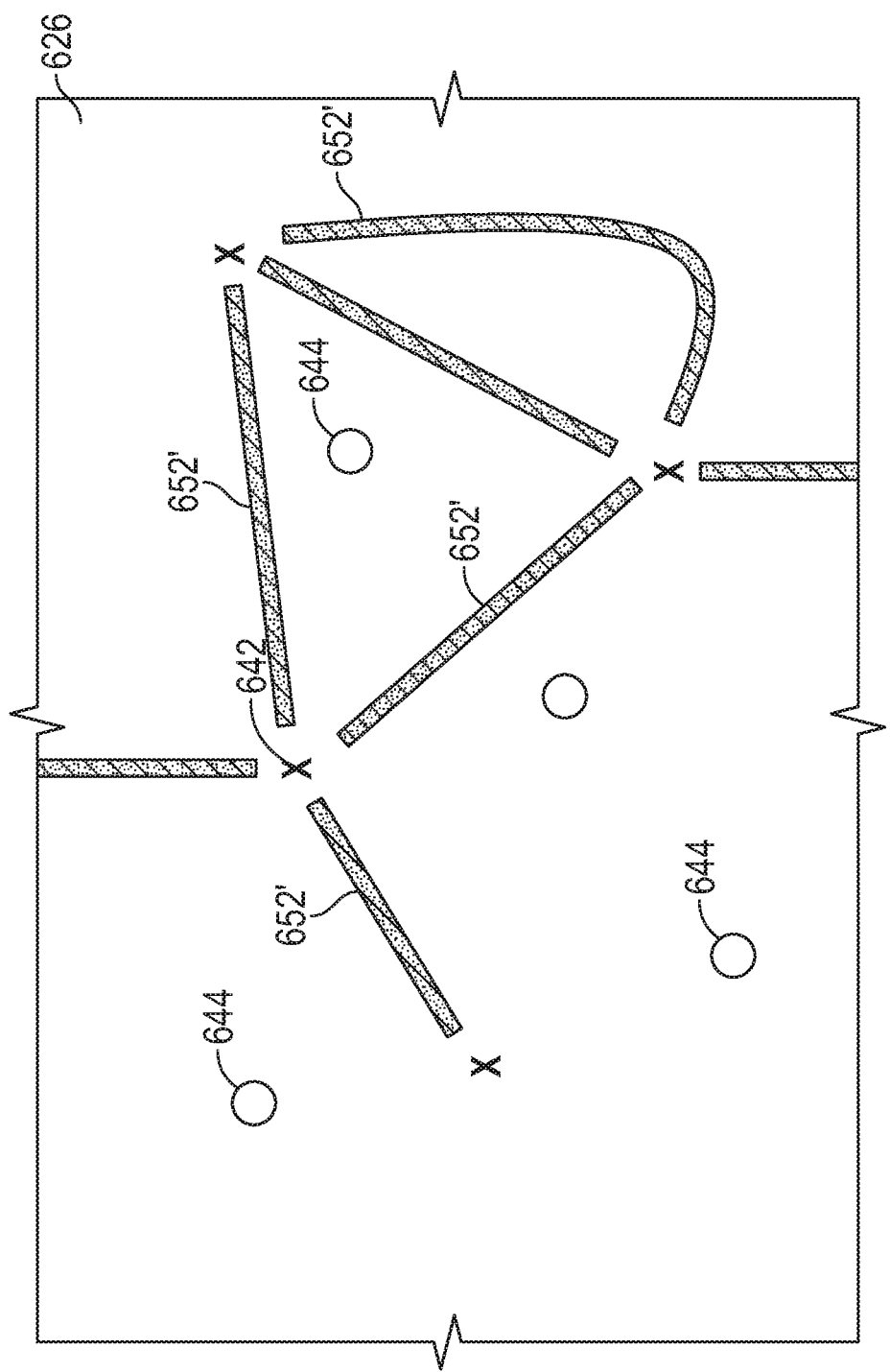
FIG. 6 is a schematic illustration of thermal transfer features arranged within a combustor panel in accordance with an embodiment of the present disclosure.

Turning now to FIG. 6, an alternative configuration of thermal transfer features arranged within a combustor panel 626 is schematically shown. The combustor panel 626 includes a number of effusion holes 644 and a number of impingement holes 642 arranged below the combustor panel 626 (shown as "X"). In this embodiment, the combustor panel 626 is configured with only first-type thermal transfer features 652'. That is, all first-type thermal transfer features 652' of the embodiment of FIG. 6 extend from one impingement hole 642 to another impingement hole 642. As such, each of the first-type thermal transfer features 652' have condenser sections at each end of the thermal transfer feature and an evaporator section in the middle. As shown, the first-type thermal transfer features 652' can have various geometric shapes, and as shown in this configuration have linear or curved shapes.

Figure 7:
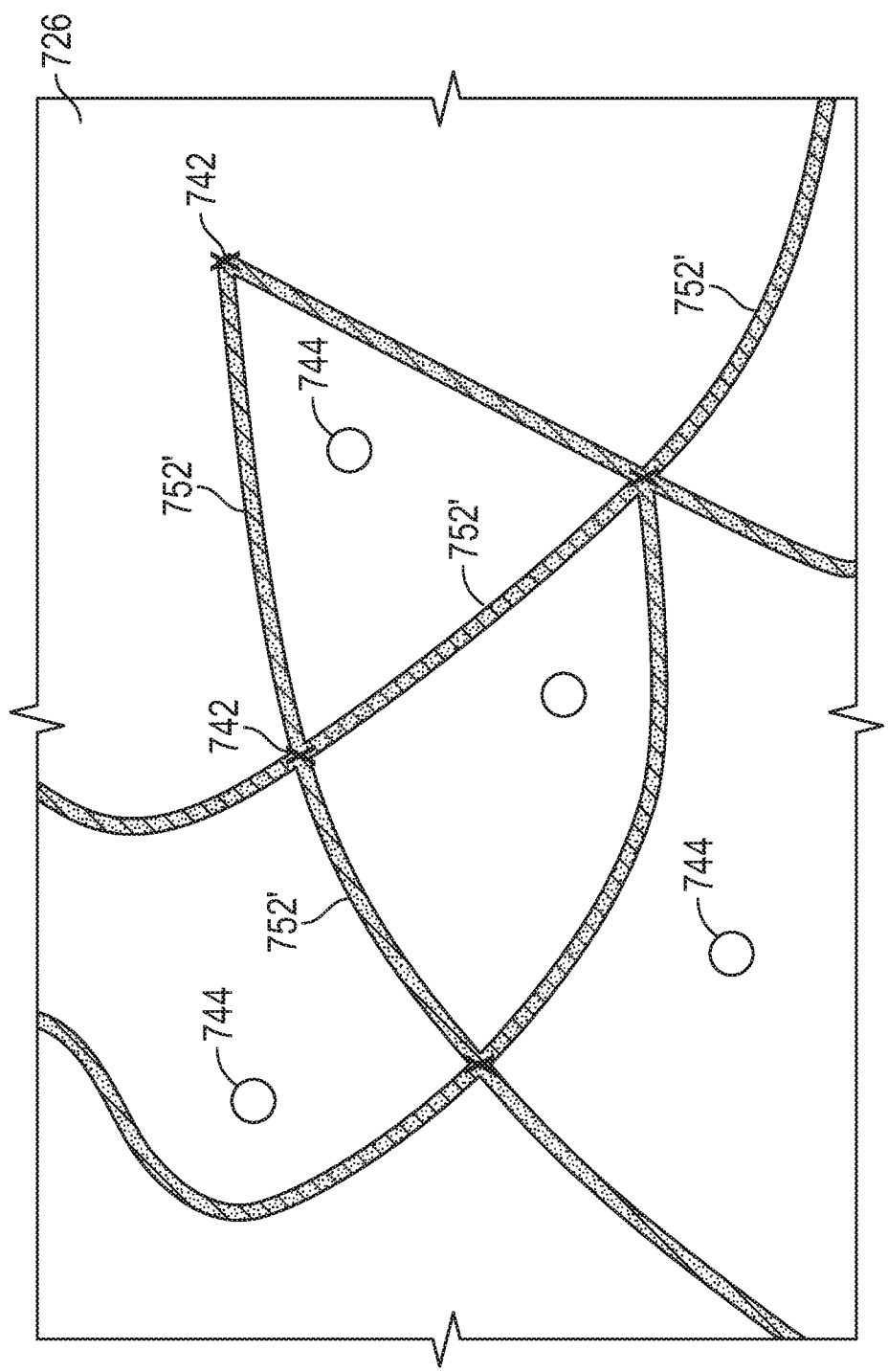
FIG. 7 is a schematic illustration of thermal transfer features arranged within a combustor panel in accordance with an embodiment of the present disclosure.

Turning now to FIG. 7, another alternative configuration of thermal transfer features arranged within a combustor panel 726 is schematically shown. The combustor panel 726 includes a number of effusion holes 744 and a number of impingement holes 742 arranged below the combustor panel 726 (shown as "X"). In this embodiment, the combustor panel 726 is configured with only first-type thermal transfer features 752'. That is, all first-type thermal transfer features 752' of the embodiment of FIG. 7 extend from one impingement hole 742 to another impingement hole 742. As such, each of the first-type thermal transfer features 752' have condenser sections at each end of the thermal transfer feature and an evaporator section in the middle. As shown, the first-type thermal transfer features 752' can have various geometric shapes, and as shown in this configuration have linear or curved shapes. Further, in this embodiment, as illustrated, the thermal transfer features 752' are continuous such that they extend across the location of an impingement hole 742.

Those of skill in the art will appreciate that in some configurations, a thermal transfer feature can be a hybrid of first- and second-type thermal transfer features as shown and described above. For example, with reference to FIG. 7, a single thermal transfer feature can start at location proximate a first impingement hole, extend continuously past a second impingement hole, and then terminate at a location that is not proximate an impingement hole.

Figure 8:
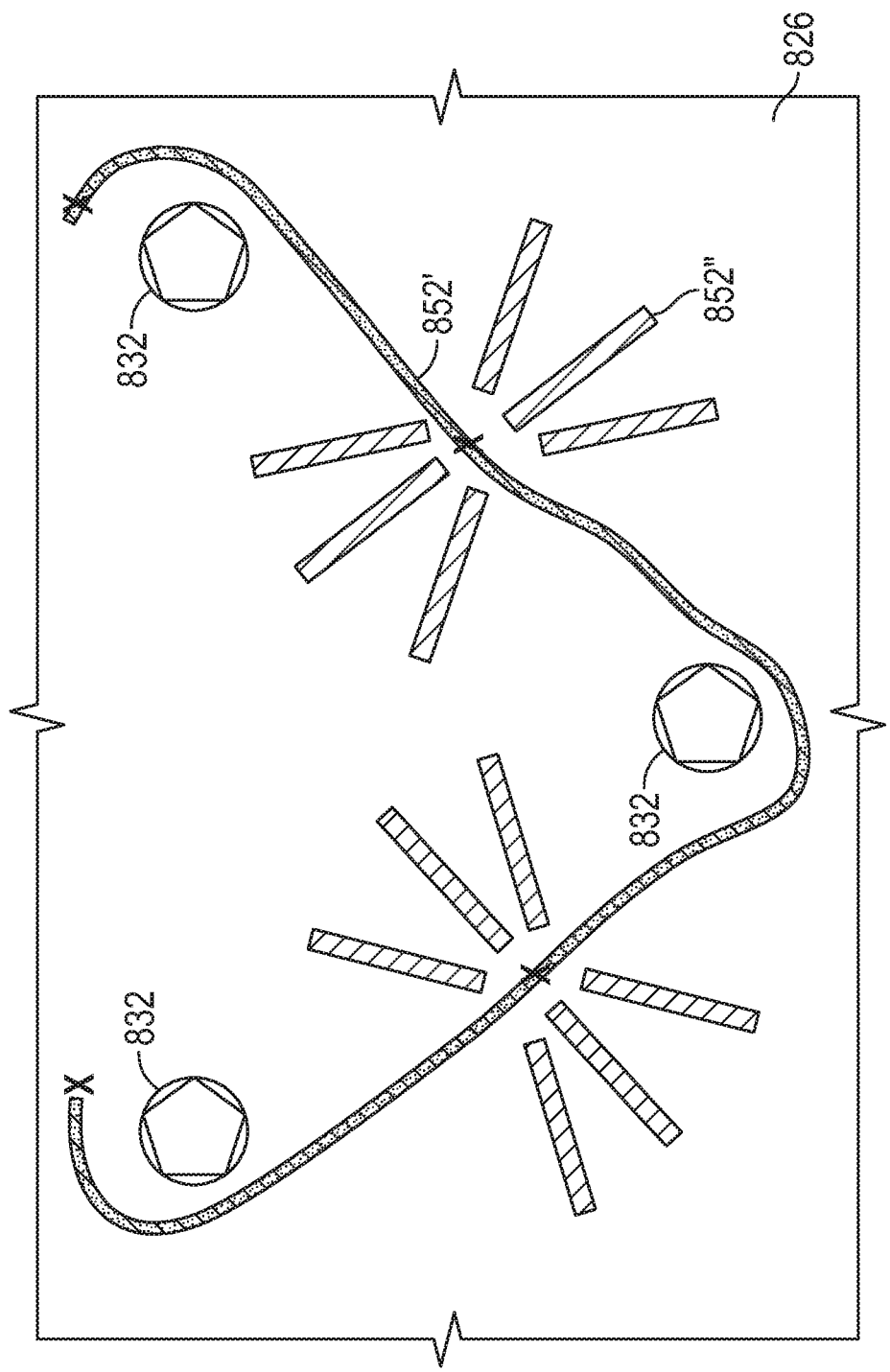
FIG. 8 is a schematic illustration of thermal transfer features arranged within a combustor panel in accordance with an embodiment of the present disclosure.

Turning now to FIG. 8, another alternative configuration of thermal transfer features arranged within a combustor panel 826 is schematically shown. The combustor panel 826 includes a number of effusion holes 844 and a number of impingement holes 842 arranged below the combustor panel 826 (shown as "X"). Also schematically shown in this illustration are a number of attachment mechanisms 832 that are arranged to fixedly attach the combustor panel 826 to a combustor shell, as shown and described above. In this embodiment, the combustor panel 826 is configured with first-type thermal transfer features 852' and second-type thermal transfer features 852". In this embodiment, the first-type thermal transfer features 852' extend from one impingement hole 842 to another impingement hole 842 and are positioned around the attachment mechanisms 832. The second-type thermal transfer features 852" are shown extending from various of the impingement holes 842.

In some alternative configurations, second-type thermal transfer features can be used to aid in providing improved cooling around the attachment mechanisms. In such configurations, an evaporator section can be located proximate the attachment mechanism and the condenser section is located proximate an impingement hole.

Figure 9A:
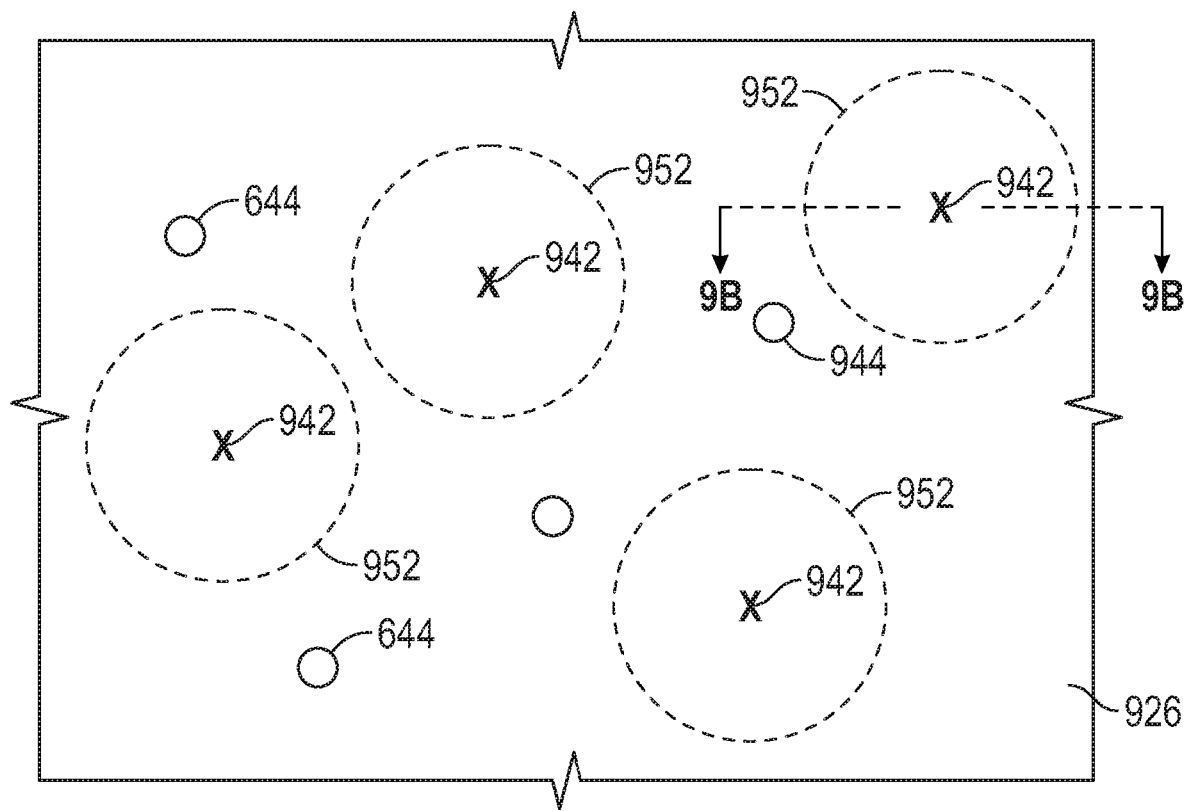
FIG. 9A is a schematic illustration of thermal transfer features arranged within a combustor panel in accordance with an embodiment of the present disclosure.
Figure 9B:
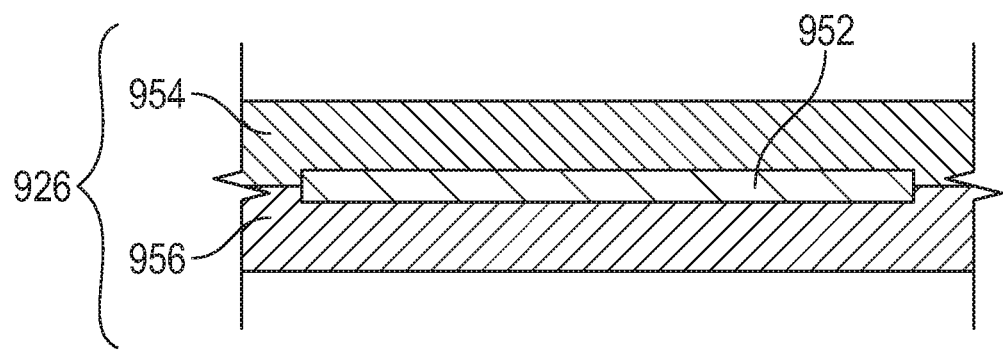
FIG. 9B is a cross-sectional illustration of a thermal transfer feature of FIG. 9A as viewed along the line B-B.

Turning now to FIGS. 9A-9B, an alternative configuration of thermal transfer features in accordance with an embodiment of the present disclosure is shown. In the embodiment of FIGS. 9A-9B, a combustor panel 926 includes a number of effusion holes 944 and a number of impingement holes 942 arranged below the combustor panel 926 (shown as "X"). In this embodiment, a plurality of thermal transfer features 952 are arranged relative to the impingement holes 942, as described above. However, in this embodiment, the thermal transfer features 952 are disc-shaped rather than elongated such as shown and described above. Rather than being tubes or channels with a media moveable therein (i.e., changing from one state to another), the disc-shaped thermal transfer features 952 are solid state. In accordance with some embodiments of the present disclosure, the solid state thermal transfer features are formed from materials having an in-plane conductivity that is higher than that of the combustor panel material. In one non-limiting example of a solid state thermal transfer feature, the thermal transfer features 952 can be formed from encapsulated pyrolytic graphite. As shown in FIG. 9B, a cross-sectional illustration of the thermal transfer feature 952 as viewed along the line B-B of FIG. 9A is shown. As noted, rather than being an open channel or cavity, the thermal transfer feature 952 is a solid, and thus the disc-shape can be provided. The thermal transfer feature 952 is sandwiched between first and second panel sheets 954, 956. Advantageously, by sandwiching the solid state thermal transfer feature 952 between the panel sheets 954, 956, the material of the thermal transfer feature 952 is protected from being exposed to air or combustion gases. Such protection can allow for use of materials (including graphite) that may oxidize or corrode if exposed to such gases.

Although described above as a variety of discrete examples, those of skill in the art will appreciate that various combinations and/or alterations can be employed without departing from the scope of the present disclosure. For example, in some embodiments, the linear thermal transfer features can be formed from solid state materials. Further, in some embodiments, a combination of solid state and state change materials can be employed. For example, in one non-limiting example, state change materials within channels can be used for thermal transfer features that are near attachment mechanisms of a combustor panel and solid state disc shaped thermal transfer features can be employed away from the attachment mechanisms.

Figure 10:
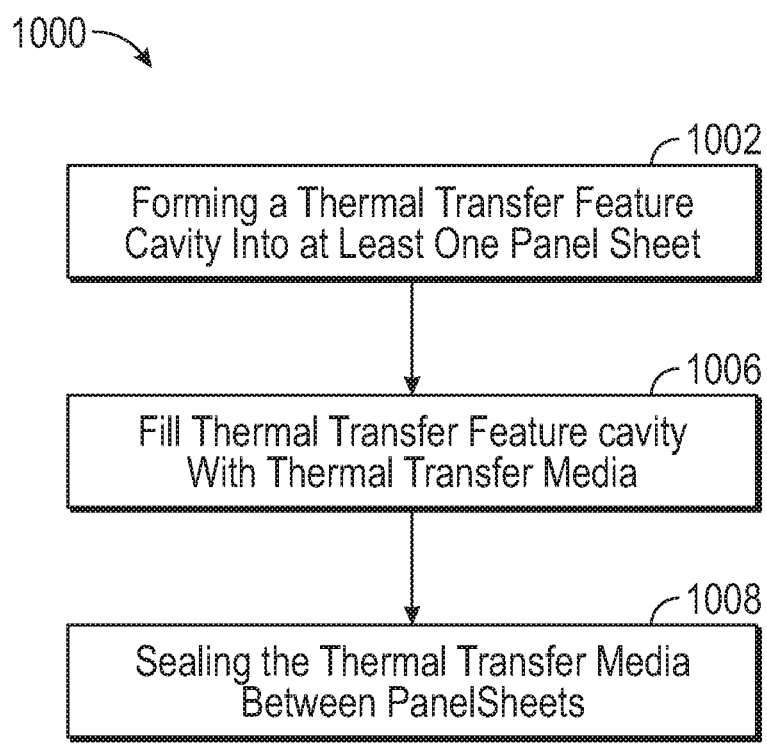
FIG. 10 is a flow process for manufacturing a combustor panel having thermal transfer features in accordance with an embodiment of the present disclosure.

Turning now to FIG. 10, a flow process 1000 for manufacturing a combustor panel in accordance with an embodiment of the present disclosure is shown. The flow process 1000 can be used to manufacture combustor panels as shown and described above, including one or more thermal transfer features.

At block 1002, at least one panel sheet of a combustor panel is formed with a thermal transfer feature cavity therein. The forming can be cutting, etching, stamping, additive manufacturing etc. In some embodiments, the forming of the thermal transfer feature cavity can be by, but is not limited to, micromachining, grinding, laser cutting, and/or chemical etching of a panel sheet. In some embodiments a single panel sheet is cut to have a specific geometry for the thermal transfer features and, in other embodiments, two sheets can be cut to form thermal transfer feature cavities in both sheets. The cutting of two sheets can be performed to generate cavities that will align when the two panel sheets are joined or can be performed to generate cavities that are offset when the two panel sheets are joined. The panel sheet can be a sheet of a high temperature super alloy material, such as, but not limited to, Inconel.

At block 1004, the cut thermal transfer feature cavity is filled with a thermal transfer media. In some embodiments, such filling can be placement of a solid state thermal transfer feature (e.g., encapsulated pyrolytic graphite), can be injection of a fluid into a formed cavity, installation of a heat pipe into the cavity, etc. In some embodiments, the filling can be by charging or placing a working fluid into a formed channel (i.e., the cavity). As will be appreciated by those of skill in the art, such filling may be performed at room temperature, and thus many of the working fluids/media may be in the form of a solid (e.g. a powder) at the time of manufacture. Then, during operation of a combustor, the solid working media liquefies and vaporizes to enable the thermal transfer within the combustor panels.

At block 1006, the thermal transfer media is sealed within a combustor panel. Such sealing can be by joining two panel sheets to form the combustor panel having at least one thermal transfer feature therein. The joining can be performed in a vacuum such that the media within the thermal transfer feature cavity remains in the cavity and prevent air from becoming trapped within the thermal transfer feature cavities. Further, to join the two panel sheets, bonding can be performed, including, but not limited to brazing, friction welding, clinching, etc. and/or combinations thereof.

In some embodiments, the entire process 1000 can be performed substantially simultaneously in an additive manufacturing process that includes the filling step. For example, an additive manufacturing process can use a first material to form the majority of the combustor panel and a second material is used to form the thermal transfer feature.

Although shown and described herein with various numbers and arrangements of thermal transfer features, those of skill in the art will appreciate that such examples are provided for illustrative and explanatory purposes and are not to be limiting. For example, the number of thermal transfer features that are included in a combustor panel can be selected to optimize thermal conductivity and balance such optimization with other conditions and/or considerations, including, but not limited to, combustor panel strength, combustor panel weight, location and arrangement of impingement holes, effusions holes, and/or attachment mechanisms.

Advantageously, embodiments described herein provide panels in a combustor of a gas turbine engine having improved cooling. Such cooling of combustor panels is achieved by the inclusion of thermal transfer features that are formed within the panels. Such thermal transfer features can be state change or solid state features that can transfer heat from hot spots that are away from impingement cooling holes to the area proximate the impingement cooling holes, thus enabling cooling of the combustor panels. The cooling provided by embodiments of the present disclosure allow for the combustor panels to be operated at lower temperature, thus improving life and durability. Further, cooling provided by embodiments of the present disclosure can reduce the amount of cooling air required on the combustor panel thus improving overall engine performance and efficiency.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the spirit and scope of the present disclosure. Additionally, while various embodiments of the present disclosure have been described, it is to be understood that aspects of the present disclosure may include only some of the described embodiments.

For example, although a specific example of a combustor panel having thermal transfer features has been shown and described herein, inclusion of thermal transfer features of the present disclosure are not limited to combustor panels. For example, any component for a gas turbine engine that has impingement cooling can incorporate thermal transfer features as shown and described. Each of these components may have a hot side surface that may be exposed to hot fluids (e.g., hot air) and/or friction such that the component requires cooling. In the above description of the combustor panels have a hot side surface that is facing the combustion chamber. In a blade outer air seal, the hot side surface can be a gas path and/or contact surface that is heated by combusted gases that exit a combustor and/or is heated by friction contact with a rotating blade.

In such components, a cold side surface is opposite the hot side surface, e.g., away from the hot side surface of the same component. The cold side surface receives cooling impingement at one or more cold locations that are formed where cooling impingement air contacts the cold side surface of the component. At least one thermal transfer feature is located between the hot side surface and the cold side surface within the component and arranged such that a condenser section of the thermal transfer feature is located proximate at least one of the cold locations and an evaporator section of the thermal transfer feature is located away from the cold location. Those of skill in the art will appreciate that components that can incorporate thermal transfer features as described herein can include, but are not limited to, blade outer air seals, combustor panels, and combustor shells.

Accordingly, the present disclosure is not to be seen as limited by the foregoing description, but is only limited by the scope of the appended claims.

What is claimed is:

1. A combustor of a gas turbine engine comprising:
   a combustor shell having a plurality of impingement holes, the combustor shell defining a combustion chamber;
   a combustor panel mounted to the combustor shell within the combustion chamber, the combustor panel having a plurality of effusion holes formed therein, the combustor panel having a hot side surface configured to be exposed to hot fluids and a cold side surface opposite thereof that is configured to be impinged by cooling air from the impingement holes;
   a first impingement hole of the plurality of impingement holes defining a central axis that projects radially inward through the combustor panel, the central axis intersecting the combustor panel at a position;
   at least one first thermal transfer feature located within the combustor panel, the at least one first thermal transfer feature extending between a first end and a second end in a first direction, the first end located at a first distance from the position, the second end located at a second distance from the position, wherein the second distance is greater than the first distance;
   at least one second thermal transfer feature located within the combustor panel, the at least one second thermal transfer feature extending between a first end and a second end in a second direction, the first end of the at least one second thermal transfer feature located at a third distance from the position, the second end of the at least one second thermal transfer feature located at a fourth distance from the position, wherein the fourth distance is greater than the third distance;
   at least one additional thermal transfer feature located within the combustor panel, the at least one additional thermal transfer feature extending between a first end and a second end in a third direction, the first end of the at least one additional thermal transfer feature located at a fifth distance from the position, the second end of the at least one additional thermal transfer feature located at a sixth distance from the position, wherein the sixth distance is greater than the fifth distance;
   wherein each thermal transfer feature is separate from each other thermal transfer feature and defined by a respective channel formed within the combustor panel, a thermal transfer media is sealed within each channel such that the thermal transfer media is protected from being exposed to air or combustion gases; and
   wherein the first direction, the second direction, and the third direction are different directions.

2. The combustor of claim 1, wherein the thermal transfer media is lithium, sodium, potassium, cesium, or encapsulated pyrolytic graphite.

3. The combustor of claim 1, wherein an evaporator section of the at least one first thermal transfer feature is located between the first end and the second end.

4. The combustor of claim 1, wherein each second thermal transfer feature has a condenser section located at the first end and evaporation occurs along a remaining length of each respective second thermal transfer feature by absorbing heat from the combustor panel.

5. The combustor of claim 1, wherein the combustor panel is formed from a first panel sheet and a second panel sheet and each thermal transfer feature is formed between the first and second panel sheets.

6. The combustor of claim 5, wherein the first panel sheet includes the respective channel of each thermal transfer feature and the second panel sheet is a continuous panel and the first panel sheet has a greater thickness than the second panel sheet at locations away from each respective channel.

7. The combustor of claim 5, wherein the first panel sheet defines a first portion of the respective channel of each thermal transfer feature and the second panel sheet defines a second portion of the respective channel of each thermal transfer feature, wherein the first portion and the second portion are aligned.

8. The combustor of claim 5, wherein the first panel sheet defines a first portion of the respective channel of each thermal transfer feature and the second panel sheet defines a second portion of the respective channel of each thermal transfer feature, wherein the first portion and the second portion are offset from each other.

9. The combustor of claim 1, wherein each thermal transfer feature is a micro heat pipe.

10. A component for a gas turbine engine comprising:
a hot side surface configured to be exposed to hot fluids;
a cold side surface configured to receive cooling impingement at one or more cold positions;
at least one first thermal transfer feature located between the hot side surface and the cold side surface within the component, the at least one first thermal transfer feature extending between a first end and a second end in a first direction, the first end located at a first distance from a first cold position of the one or more cold positions, the second end located at a second distance from the first cold position, wherein the second distance is greater than the first distance;
at least one second thermal transfer feature located between the hot side surface and the cold side surface within the component, the at least one second thermal transfer feature extending between a first end and a second end in a second direction, the first end of the at least one second thermal transfer feature located at a third distance from the first cold position, the second end of the at least one second thermal transfer feature located at a fourth distance from the first cold position, wherein the fourth distance is greater than the third distance;
at least one additional thermal transfer feature located between the hot side surface and the cold side surface within the component, the at least one additional thermal transfer feature extending between a first end and a second end in a third direction, the first end of the at least one additional thermal transfer feature located at a fifth distance from the first cold position, the second end of the at least one additional thermal transfer feature located at a sixth distance from the first cold position, wherein the sixth distance is greater than the fifth distance;
wherein each thermal transfer feature is separate from each other thermal transfer feature and defined by a respective channel formed within the component, a thermal transfer media is sealed within each channel such that the thermal transfer media is protected from being exposed to air or combustion gases; and
wherein the first direction, the second direction, and the third direction are different directions.

11. The component of claim 10, wherein the component is a blade outer air seal, a combustor panel, or a combustor shell.

12. A combustor of a gas turbine engine comprising:
a combustor shell having a plurality of impingement holes, the combustor shell defining a combustion chamber;
a combustor panel mounted to the combustor shell within the combustion chamber, the combustor panel having a plurality of effusion holes formed therein, the combustor panel having a hot side surface configured to be exposed to hot fluids and a cold side surface opposite thereof, wherein the cold side surface is configured to be impinged by cooling air from the plurality of impingement holes;
each impingement hole of the plurality of impingement holes defines a central axis that projects radially inward through the combustor panel;
at least one thermal transfer feature located within the combustor panel, wherein the at least one thermal transfer feature comprises a solid state thermal transfer feature;
wherein the at least one thermal transfer feature is defined by at least one cavity formed within the combustor panel, the solid state thermal transfer feature sealed within the at least one cavity such that the solid state thermal transfer feature is protected from being exposed to air or combustion eases; and
wherein the at least one thermal transfer feature has a disc-shape having a diameter extending along a longitudinal axis of the combustor and a thickness extending along a radial axis of the combustor, a center of the disc-shape intersects the central axis of an impingement hole of the plurality of impingement holes such that cooling air impinges upon the at least one thermal transfer feature at the center of the disc-shape.

13. The combustor of claim 12, wherein the combustor panel is formed from a first panel sheet and a second panel sheet and the at least one thermal transfer feature is formed between the first and second panel sheets.

14. The combustor of claim 13, wherein the first panel sheet includes at least one channel and the second panel sheet is a continuous panel and the first panel sheet has a greater thickness than the second panel sheet at locations away from the at least one thermal transfer feature.

15. The combustor of claim 13, wherein the first panel sheet defines a portion of the at least one channel and the second panel sheet defines a portion of the at least one channel, wherein the respective portions of the at least one channel of the first and second panel sheets are aligned.

16. The combustor of claim 13, wherein the first panel sheet defines a portion of the at least one channel and the second panel sheet defines a portion of the at least one channel, wherein the portions of the at least one channel of the first and second panel sheets are offset from each other.

* * * * *